UNITED STATES PATENT OFFICE.

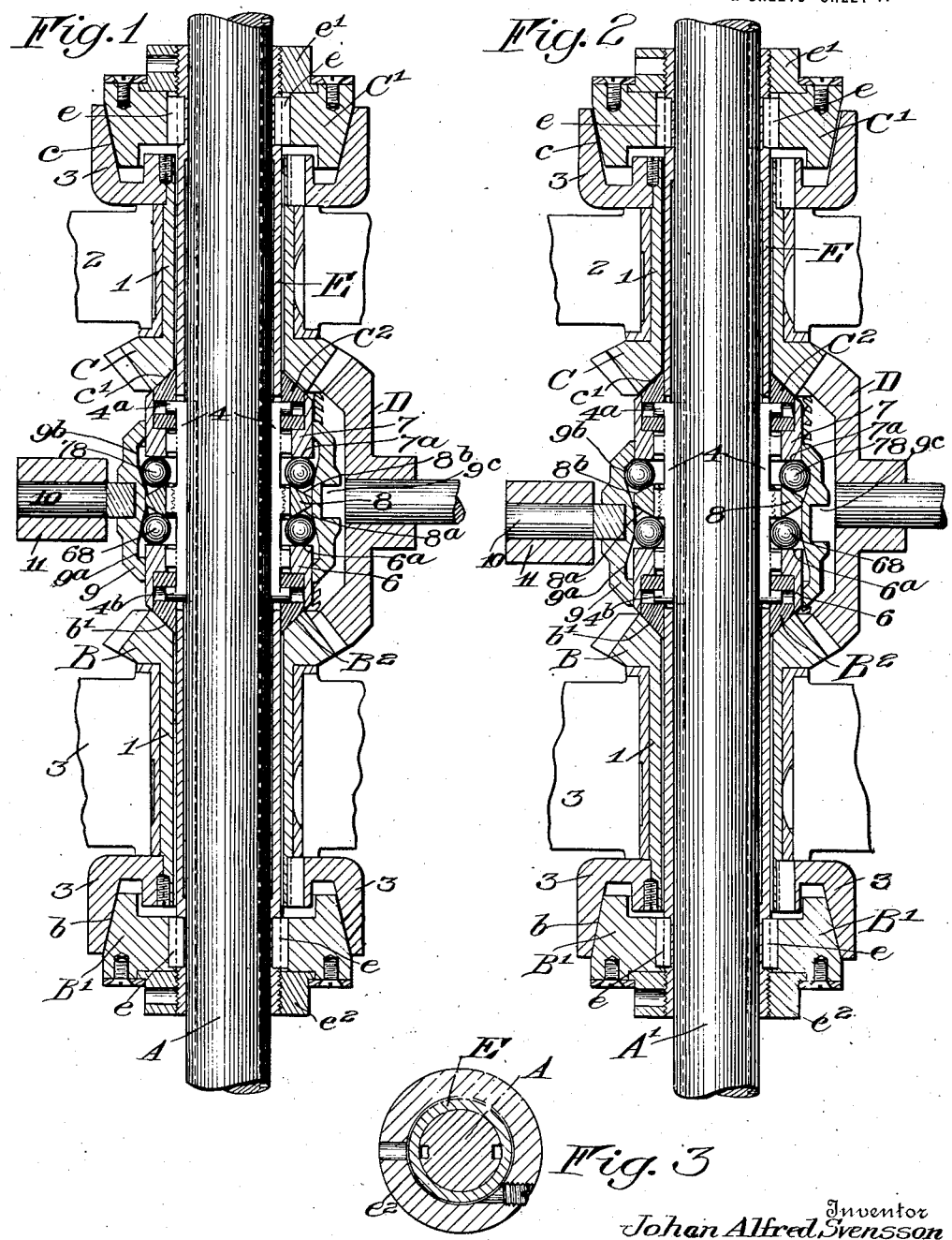

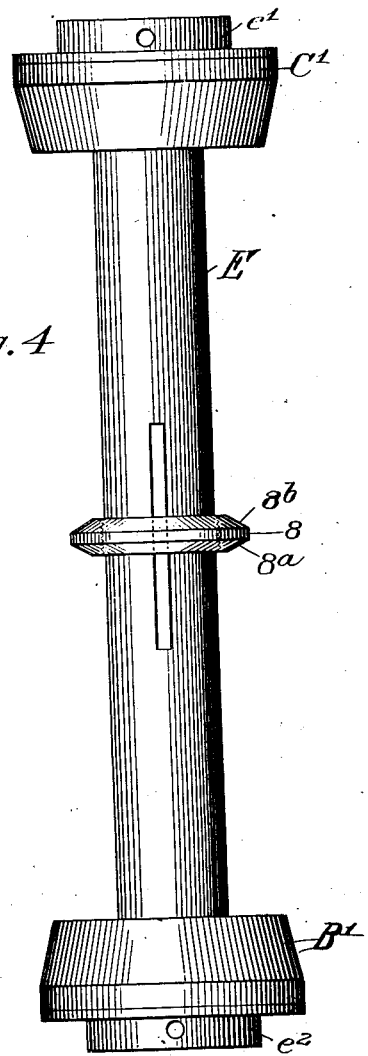
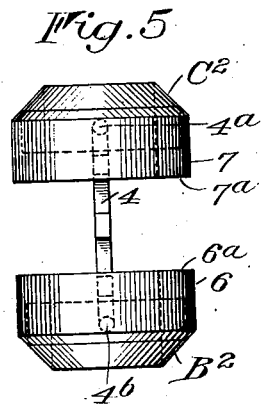

JOHAN ALFRED SVENSSON, OF ROCHESTER, NEW YORK, ASSIGNOR, BY MESNE ASSIGNMENTS, TO LANDIS TOOL COMPANY, OF WAYNESBORO, PENNSYLVANIA, A CORPORATION OF PENNSYLVANIA.

CLUTCH MECHANISM.

1,177,661.         Specification of Letters Patent.      Patented Apr. 4, 1916.

Application filed October 31, 1912. Serial No. 728,829.

*To all whom it may concern:*

Be it known that I, JOHAN ALFRED SVENSSON, of Rochester, in the county of Monroe and State of New York, have invented certain new and useful Improvements in Clutch Mechanisms; and I do hereby declare the following to be a full, clear, and exact description of the same, reference being had to the accompanying drawings, forming a part of this specification, and to the reference-numerals marked thereon.

My present invention has for its object to provide a clutch mechanism adapted for use in connection with various classes of machinery, especially where the parts must necessarily be made compact and the operation of the machine requires a delicacy in the action of the clutch mechanism.

My invention has for its further object to provide a mechanism of this character by means of which forward and reverse motions may alternately be imparted to separate driven elements arranged in juxtaposition to each other.

To these and other ends the invention consists in certain improvements and combinations of parts all as will be hereinafter more fully described, the novel features being pointed out in the claims at the end of the specification.

In the drawings: Figures 1 and 2 are central longitudinal sectional views of a clutch mechanism constructed in accordance with my invention, the first showing the parts in the neutral or inoperative position and the second showing them in one position of adjustment. Fig. 3 is a cross sectional view taken on the line 3× 3× of Fig. 1. Fig. 4 is a detail side elevation of the outer clutch member, and Fig. 5 is a similar view of the central or inner clutch member.

In the mechanism illustrated to show one embodiment of my invention, the driving element comprises the shaft A and the driven element or elements, are indicated by B and C, constructed in the form of bevel pinions with which meshes the gear wheel D to which motion is imparted in a forward direction by the pinion B and in the reverse direction by the pinion C, according to the direction of rotation of the shaft A when one or the other of the other of these pinions is connected thereto by the clutch devices. The two pinions are each provided with hubs 1 journaled in suitable bearings 2 and 3 in which they are held against longitudinal movement by the shoulders provided at their inner and outer ends as shown so that although these pinions are free to rotate, they are prevented against lateral movement to any appreciable extent. The pinions are provided on their outer end with clutch surfaces, in the present instance shown as conical faces $b$ and $c$ in the enlarged ends or cups 3—3 rigidly secured on the outer ends of the hubs of the pinions. Other clutch faces or surfaces indicated by $b'$ and $c'$, are provided on the inner or proximate ends of the respective pinions.

Two clutch members are employed for effecting the connection between the driving shaft or member A and the driven members or pinions B and C. One of these clutch members is provided with means adapted to engage the outer clutch faces of the two pinions when shifted axially relatively thereto in opposite directions and the other clutch member is arranged to coöperate with the inner clutch surfaces when similarly adjusted. Between the two clutch members are arranged operating devices actuated by a suitable controller, serving to simultaneously actuate the two clutch members so that they may be caused to engage with the opposite ends or faces of one or the other of the two pinions, as shown in Fig. 2, or to be disengaged from both pinions and occupy a neutral position as shown in Fig. 1.

In the clutch mechanism illustrated the clutch members are shown as concentric sleeves surrounding the shaft A and each composed of a number of separate parts to facilitate their construction, the assembling of the parts of the clutch and its adjustment. The inner clutch member, or sleeve, E extends through both of the pinions and at its extremities carries conical clutch portions or heads B′ and C′, fixed to the sleeve by keys $e$ and each adjustable longitudinally thereon by nuts $e'$ and $e^2$ into proper working relationship with the conical clamping surfaces $b$ and $c$ of the pinions. Intermediate of the latter the sleeve E is provided with elongated apertures receiving keys 4 secured in suitable keyways or recesses in the shaft A, said keys and slots also serving to permit the longitudinal movement of the clutch sleeves relatively to each other and to the shaft A, but preventing their rotative movement thereon and further serving as the driving connection between said shaft and clutch members.

The outer clutch member is composed of the friction shoes at its ends in the form of rings $B^2$, $C^2$ having the outer conical surfaces adapted to coöperate with the inner clutch surfaces $b'$ and $c'$, said rings being held in relatively fixed positions by pins $4^a$ and $4^b$ at the opposite ends of the keys 4 which enter suitable apertures or recesses as shown. Fitted to the shoes are collars 6 and 7, the edges of which, indicated by $6^a$ and $7^a$, constitute opposing shoulders employed for the purpose of moving the outer sleeve in opposite directions as will be more fully explained.

Elements constituting an operating connection between the two clutch members are provided whereby these may be simultaneously actuated in opposite directions and one means of carrying out my invention consists in providing on the concentric sleeve opposing shoulders or abutments with which wedge members coöperate; these being actuated by a shiftable controller. In the arrangement of the parts illustrated the inner sleeve E is shown as provided with a ring or abutment 8 threaded thereon intermediate to the shoulders $6^a$ and $7^a$ and also slotted to receive projections on the keys 4—4, which, when the parts are assembled, prevent the displacing of the ring 8. The latter is beveled on its opposite sides forming the inclined shoulders $8^a$ and $8^b$ which oppose the shoulders $6^a$ and $7^a$ of the outer clutch member or sleeve; the spaces between said pairs of shoulders constituting raceways in which the wedge members such as rows of antifriction balls 68 and 78 are placed. The distance between the shoulders $6^a$ and $7^a$ is less than the combined diameter of the balls 68 and 78 and the abutment ring 8 and the angular faces $8^a$, $8^b$ of the latter, are so proportioned that the rows of balls 68 and 78 will occupy the position shown in Fig. 1 when the clutch members are adjusted in neutral position. When one row of balls is forced in the bottom of its raceway, the clutch members will be moved in opposite directions to engage the outer and inner clutch faces of one of the two driven pinions, the parts being shown adjusted in this position in Fig. 2. The bevel faces of the abutment 8 are also of such a length that they will serve to force one row of wedge balls outwardly when the other row is crowded into its raceway.

The controlling member employed for actuating the wedge members comprises in the present instance a ring or sleeve 9, having the two inside cam surfaces $9^a$ and $9^b$, which, when the ring is adjusted axially, coöperate with the respective rows of balls crowding these into their raceway, at one side of the abutment 8, and permitting the other row of balls to slip outwardly and thus permit the required movement of the sleeves to take place. This arrangement of the parts is desirable as a constant contact may be obtained between the walls or shoulders of the raceway and the coöperating wedge members in all positions of adjustment. This permits delicate adjustment of the frictionally engaging parts of the clutch and also prevents "chattering" of said parts when operated to pick up the load. Any suitable device may be employed for shifting the ring 9, as for instance, a pin or finger 10 fitting the annular groove $9^c$ in the sleeve and carried on a lever or operating member 11.

A clutch mechanism embodying my invention is simple in construction and comprises few parts which may be easily assembled and adjusted. The arrangement of the clutch sleeves surrounding the driving shaft and the disposal of their operating connections and the shiftable controlling member in the space between the two pinions affords a very compact structure and utilizes the space required by the gear wheel D.

A further advantage obtained by the disposal of the parts in the manner described and illustrated is found in the operation of the clutch members in opposite directions to simultaneously engage opposite ends of a pinion as this action grasps the pinion and locks it to the shaft without imparting any additional friction or strain to the bearing in which it is carried.

I claim as my invention:

1. In a clutch mechanism, the combination with two driven members spaced apart, each having an outer and an inner clamping surface, of a member shiftable into alternate engagement with said outer surfaces, a second member also adjustable alternately into engagement with said inner surfaces, operating connections between the two members for causing them to engage the outer and inner surfaces of the same driven member and means for driving said two driven members.

2. In a clutch mechanism, the combination with two revoluble driven members held in spaced relation and in alinement, each having an inner and an outer clamping surface, of two driving clutch members, one adapted to coöperate with the two outer surfaces and the other to coöperate with the two inner surfaces of said driven members and means for moving said clutch members alternately in opposite directions into driving engagement with the respective outer and inner surfaces of one or the other of said driven members.

3. In a clutch mechanism, the combination with two rotary members to be driven, bearings supporting said members in spaced relation, of two clutch members, both adapted to engage opposite sides of each driven member and means for operating said members relatively to each other to simultaneously coöperate with one or the other of said driven members.

4. In a clutch mechanism, the combination with two members to be driven supported in alinement and each having clamping faces on their inner and outer ends, of a clutch member extending through the driven members and adapted to engage said outer faces, a second clutch member disposed between the driven members and adapted to coöperate with said inner faces and means for operating the two clutch members, to adjust them both into engagement with one or the other of said driven members.

5. In a clutch mechanism, the combination with a driving shaft and two driven members thereon, each having an inside and an outside clutch surface, of clutches coöperating with the outside surfaces, a clutch coöperating with said inner surfaces and means for simultaneously operating said clutches to engage the inner and outer faces of one driven member and disengage the corresponding faces of the other driven member.

6. In a clutch mechanism, the combination with two tubular driven members journaled in alinement, each provided with an outer and an inner clutch face, of a clutch member extending through said driven members and having parts adapted when the clutch member is shifted to engage with one or the other of said driven members, means for driving the clutch member and means for shifting it longitudinally.

7. In a clutch mechanism, the combination with two tubular driven members, journal boxes supporting them and a driving shaft extending through said members, of a sleeve keyed to the shaft and also extending through said members having heads adapted to engage the outer faces of the driven members and means for shifting said sleeve into engagement with one or the other of said members.

8. In a reversing clutch mechanism, the combination with a driving shaft, two driven bevel gear pinions thereon, and a gear wheel meshing with both pinions, said pinions being provided upon their proximate ends with clutch faces and having bearing hubs at the ends of which are also provided outer clutch faces and journal bearings supporting said hubs, of a sleeve carried on the shaft and extending through the pinions and having heads adapted to coöperate with said outer faces, a clutch member interposed between the pinions and means for moving the sleeve and clutch member in opposite directions and into engagement with one or the other of said pinions.

9. In a clutch, the combination with driving and driven members and two clutch members driven by the driving member and coöperating with the driven members and having concentric portions, of means arranged between said concentric portions for operating the two members longitudinally in opposite directions and a shiftable controlling sleeve inclosing said operating means.

10. In a reversing clutch mechanism, the combination with two spaced bearings, two alined tubular pinions journaled therein having outer clutch faces and inner clutch faces on their proximate ends, a clutch member extending through both pinions having heads adapted to engage the outer faces and a separate clutch head surrounding the member and adapted to alternately engage the inner faces, of sets of opposing cam shoulders arranged on the clutch member and clutch head forming raceways between them, sets of wedge members in said ways, and an actuating member surrounding said wedges and shiftable axially to operate therein and cause the clutch member and clutch head to simultaneously coöperate with one or the other of said pinions.

JOHAN ALFRED SVENSSON.

Witnesses:
 ALBERT J. CHRIST,
 F. E. PROVOST.